(12) United States Patent
Watanabe et al.

(10) Patent No.: US 6,445,566 B2
(45) Date of Patent: Sep. 3, 2002

(54) POWER SOURCE ELEMENT

(75) Inventors: Shunji Watanabe; Tsugio Sakai, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/767,506

(22) Filed: Jan. 23, 2001

(30) Foreign Application Priority Data

Feb. 4, 2000 (JP) .................................... 2000-027730

(51) Int. Cl.[7] .................................................. H01G 9/00
(52) U.S. Cl. ................... 361/502; 361/503; 361/508; 361/509; 361/523; 429/27
(58) Field of Search ................. 361/502, 505, 361/517, 504, 509, 433, 508, 528, 533, 305, 519, 523, 535; 429/27, 155

(56) References Cited

U.S. PATENT DOCUMENTS

| | | | | |
|---|---|---|---|---|
| 4,488,203 A | * | 12/1984 | Muranaka et al. | 361/433 |
| 4,783,723 A | * | 11/1988 | Watanabe et al. | 361/433 |
| 5,362,577 A | * | 11/1994 | Pedicini | 429/27 |
| 5,385,794 A | * | 1/1995 | Yokoyama et al. | 429/194 |
| 5,578,394 A | * | 11/1996 | Oweis et al. | 429/155 |
| 5,621,607 A | * | 4/1997 | Farahmandi et al. | 361/502 |
| 5,953,204 A | * | 9/1999 | Suhara et al. | 361/502 |
| 5,973,913 A | * | 10/1999 | McEwen et al. | 361/523 |

* cited by examiner

Primary Examiner—Dean A. Reichard
Assistant Examiner—Nguyen Ha
(74) Attorney, Agent, or Firm—Adams & Wilks

(57) ABSTRACT

A power source element has a container made of an insulation material. The container has an interior space containing an anode active material, a cathode active material spaced apart from the anode active material, and an electrolyte material. A first current collector is disposed on an inner base surface of the container. A first connecting terminal is disposed on an outer base surface of the container and is electrically connected to the first current collector. A second current collector is connected to the container. A second connecting terminal is disposed on the outer base surface of the container and is electrically connected to the second current collector.

30 Claims, 2 Drawing Sheets

POWER SOURCE ELEMENT

BACKGROUND OF THE INVENTION

The invention relates to a power source element, such as a non-aqueous electrolyte cell capable of being mounted on a surface or an electric double layer capacitor making use of the electric double layer theory.

Non-aqueous electrolyte cells and electric double layer capacitors have been conventionally used as backup power sources for clock function, backup power sources for memories of semiconductors, standby power sources for electronic devices such as microcomputers, IC memories and the like, cells for solar watches, and electric power sources for driving of motors, and have been investigated as electric power sources for electric automobiles and auxiliary power storage units of energy transformation and storage systems in recent years.

For backup power sources, high capacity and electric current for driving of semiconductors have been hitherto needed. In recent years, however, semiconductor memories have been put into use, which have no need of backup power sources owing to improvements in the technology of non-volatile memory. Also, low power consumption has been promoted in elements with clock function. Accordingly, there has been reduced the need for non-aqueous electrolyte cells and electric double layer capacitors, which require substantially large capacity and electric current.

A non-aqueous electrolyte cell or an electric double layer capacitor is constructed as shown in FIG. 2. A positive active material 201 is bonded to a positive electrode case 203 with an electrode collector 202 and negative active material 204 is bonded to a negative electrode case 205 with another electrode collector 202. The negative electrode case 205 is inserted into the groove for the gasket 207. With the electrolyte 206 added, the negative electrode case 205 and positive electrode case 203 are combined together and the positive electrode case 203 is crimped for sealing.

The need for non-aqueous electrolyte cells and electric double layer capacitors, which require substantially large capacity and electric current, has been reduced due to the fact that nonvolatile memories have prevailed and low power consumption has been promoted in elements with clock function. Rather, with respect to non-aqueous electrolyte cells and electric double layer capacitors, the demand has been increased for thinning of them and ref low soldering (a method of soldering, comprising beforehand applying a soldering cream or the like on those portions on a printed circuit board, which are to be subjected to soldering to place parts on the portions, or after such placing of parts, supplying small soldering balls (soldering bumps) to portions being subjected to soldering, and passing the printed circuit board with parts thereon through a furnace under high temperature atmosphere set so that portions being subjected to soldering become above the melting point of solder, for example, 200 to 230° C., to thereby melt solder).

Since conventional non-aqueous electrolyte cells and electric double layer capacitors have a cross section shown in FIG. 2 to be circular like coins and buttons, reflow soldering entails the need of beforehand welding terminals or the like to a casing, with the result that the cost goes up in terms of an increase in the number of parts and in manufacturing manhour. Also, it is necessary to provide on the board a space for terminals, and so limitation is imposed on making the cells and capacitors small in size.

SUMMARY OF THE INVENTION

In a non-aqueous electrolyte cell and an electric double layer capacitor, which are composed of active materials used as a cathode and an anode, and a container for receiving the materials and an electrolyte, the container is composed of a concave-shaped container and a sealing plate.

The concave-shaped container is made of a good heat-resistant material such as heat resisting resins, glass, ceramics or ceramic glass, and a metallic layer is formed on the inner bottom surface of the concave-shaped container to make a first collector to be electrically connected to a joining terminal disposed on the outer bottom surface of the concave-shaped container.

Also, a metallic layer is formed on an edge of the concave-shaped container to be electrically connected to a joining terminal disposed on the outer bottom surface of the concave-shaped container. A cathode active-material, a separator, and an anode active-material, which are made to be sheet-shaped, are stackingly inserted in the concave-shaped container.

The joining terminals are formed on either the outer bottom surface and sides of the concave-shaped container or either of the outer bottom surface and sides in such a manner to eliminate short-circuiting.

Subsequently, a bonding material, such as a brazing material or a solder material, having a configuration substantially identical to that of the edge of the concave-shaped container is placed on the edge of the concave-shaped container to be interposed between it and the sealing plate. The sealing plate may be formed of a metal or a good heat-resistant material such as a heat-resistant resin with a metallic layer, glass, ceramics or ceramic glass or the like.

The sealing plate is heated to above the melting point of the bonding material, such as a brazing material or a solder material, and pressurized for sealing.

Since the joining terminals are made integral with the receiving container and disposed on a lower portion of the receiving container, it becomes possible to decrease space in the form of a sheet.

Thus, the invention provides a non-aqueous electrolyte cell and an electric double layer capacitor, which are composed of active materials used as a cathode and an anode, and a container for receiving the materials and an electrolyte. The container comprises a concave-shaped container and a sealing plate, and the concave-shaped container is provided on an inner bottom surface thereof with a first collector which is electrically connected to a joining terminal disposed on an outer bottom surface and/or sides of the concave-shaped container. The sealing plate is provided on a surface inside the cell with a second collector which is electrically connected to a joining terminal disposed on an outer bottom surface and/or sides of the concave-shaped container. In this case, the sealing plate on the second collector is electrically connected to a joining terminal through the metallic layer on the edge of the concave-shaped container and bonding material.

Also, the first collector and the joining terminals disposed on the concave-shaped container of the receiving container and the metallic layer on the edge of the container are composed of a material having a main component which is a metal selected from tungsten, nickel, silver, platinum or gold.

DETAILED DESCRIPTION OF THE PREFERRED EMBODIMENTS

Figure 1:
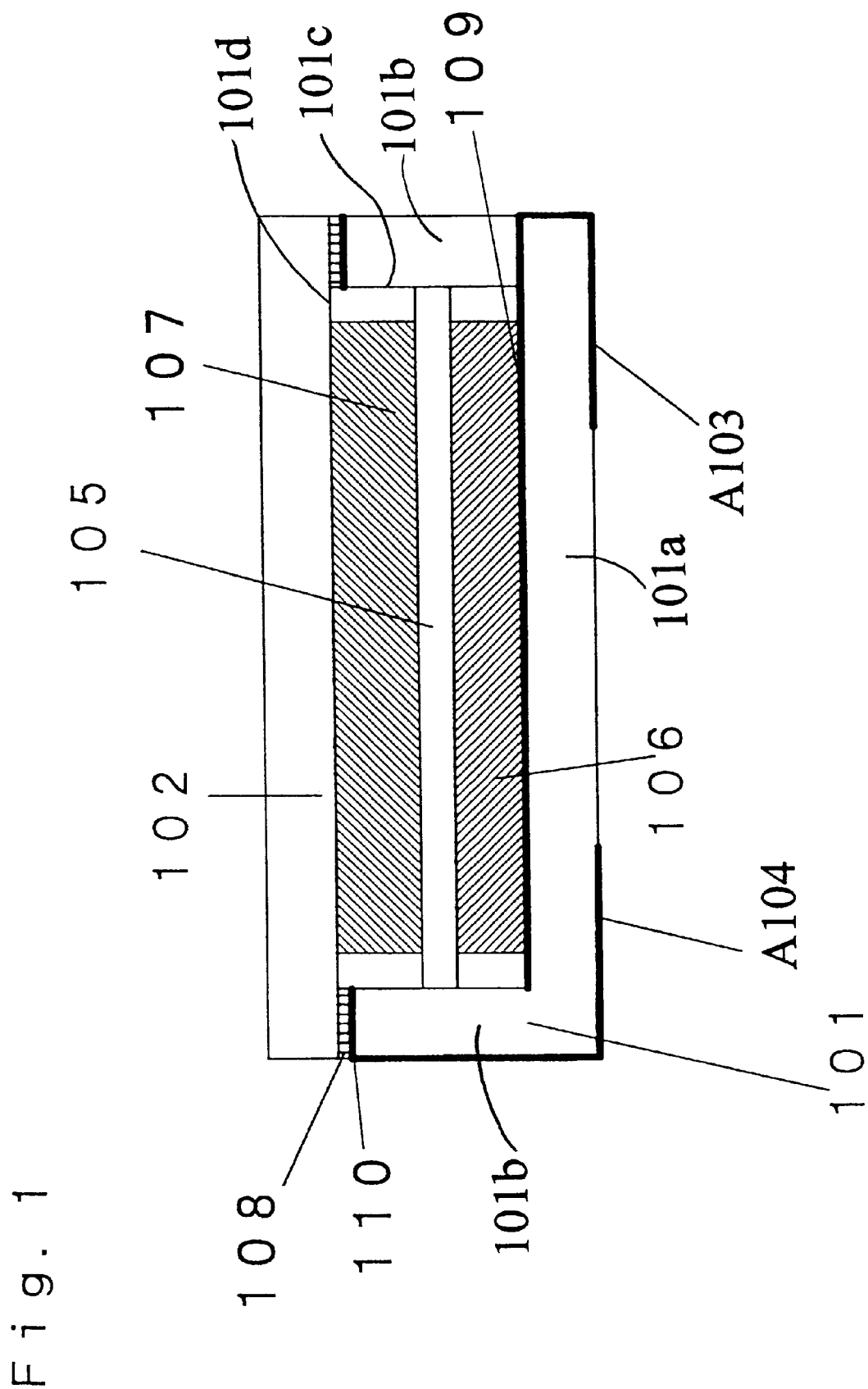
FIG. 1 is a cross sectional view showing a non-aqueous electrolyte cell and an electric double layer capacitor according to the invention.

A typical construction according to the invention will be described with reference to FIG. 1. FIG. 1 is a cross sectional view showing a non-aqueous electrolyte cell or an electric double layer capacitor according to the invention. A concave-shaped container 101 of alumina is formed by applying tungsten printing on a green sheet to bake the same, and then applying wiring of a metallic layer of nickel or gold plating on the same. The container 101 has a base portion 101a and side portions 101b extending from the base portion 101a to define an interior space 101c and an open end 101d of the container 101. The container is manufactured by the same method as that for general ceramic packages for crystal oscillators. A metallic layer 109 serving as a first current collector (hereinafter "first collector") is provided on an entire inner bottom surface, and the metallic layer 109 extends through a wall surface of the concave-shaped container 101 to be electrically connected to a connecting or joining terminal A103 on an outer bottom surface of the concave-shaped container 101 via an outer side surface of the container. A similar metallic layer 110 is provided on an edge of a top surface of the concave-shaped container 101 to extend on a left side surface of the concave-shaped container shown in FIG. 1 to be electrically connected to a connecting or joining terminal B104 on the outer bottom surface of the concave shaped container.

The joining terminals A103, A104 may be provided on the outer bottom surface of the concave-shaped container 101, or extend on the side surface from an end on the bottom surface side of the concave-shaped container 101, and get wet on solder to be able to be soldered to a board.

A cathode active material 106, a separator 105, and an anode active-material 107 are stackingly arranged and inserted on a top surface of the metallic layer 109, which defines a first collector on the inner bottom surface of the concave-shaped container 101, within the concave-shaped container 101, and a bonding material 108 is placed on the metallic layer 110 disposed on an edge of a top surface of the concave-shaped container 101. A generally plate-shaped sealing member 102 of nickel is placed on the bonding material, and is pressurized and heated to melt the bonding material 108 for sealing. An electrolyte 111 is disposed in the container 101.

The concave-shaped container 101 is preferably made of a heat resisting material such as heat resisting resins, glass, ceramics or ceramic glass or the like. A method of manufacturing the container can comprise using conductor printing to apply wiring on glass of low melting point and glass ceramics, and laminating and baking at low temperatures. Such wiring forms the joining terminal A103, the joining terminal B104, the metallic layer 109, which defines a first collector, and the metallic layer 110 disposed on the edge of the top surface of the concave-shaped container. A method of manufacturing that portion of the metallic layer 109, which extends through a wall surface of the concave-shaped container 101, is not limited to the above-mentioned method, but may comprise, for example, forming a board, which will make a bottom surface, and a frame-shaped member, which will make side surfaces of the concave-shaped container 101, forming the metallic layer 109 on the board, then stacking the board and the frame-shaped member on one another to bake them for uniting them, thus forming the concave-shaped container, whereby the portion of the metallic layer can extend through the container in gas-tight condition. Also, it is possible to perform wiring, stacking and baking with the use of conductor printing and a green sheet. In the case where the container is of a resin, the metallic terminals and the like can be formed by insert molding.

Also, that of the metallic layer 109, which makes a first collector of the wiring, is preferably of tungsten, silver and gold, which have good corrosion resistance and afford formation in the thick-film method. It is better to provide a layer of nickel, gold and solder on the joining terminals A103, B104 for soldering with the board. It is preferable to provide a layer of nickel, gold and the like, which are favorably compatible with the bonding material 108, on the metallic layer 110 on the edge of the concave-shaped container 101. Methods of forming such layers include plating, a gas phase method such as vapor deposition and the like.

The sealing plate 102 serves as a second collector and can be formed of a relatively many metals such as nickel, copper, brass, zinc, tin, gold, stainless steel, tungsten, aluminum and so on. This is because application of electric potential on a reduction side makes the metal hard to solve. On the other hand, since the metal must be made to solve when the sealing plate is used as a positive electrode, it is necessary that the material for the sealing plate be selected from a good anti-corrosion metal such as gold, platinum, stainless steel (SUS444, SUS239J4L, SUS317J4L, or the like) tungsten, aluminum and so on. In the case where a sealing plate is used which is formed of an insulating body such as heat resisting resins, glass, ceramics or ceramic glass or the like, it is necessary to provide a metallic layer, which will make a second collector, on an inner surface of the concave-shaped container 101. The material for the metallic layer can be of the same as that of the metallic sealing plate. Methods of forming the metallic layer include plating, a gas phase method such as vapor deposition, a printing method and the like.

The sealing plate 102 is connected to the joining terminal B104 through the bonding material 108, the metallic layer 110 and the like to serve as a second collector and a part of joining terminal. In the case of using the sealing plate of an insulating body, the metallic layer provided on the surface serves as a second collector and a part of the joining terminal.

That portion of the sealing plate 102, which contacts with the bonding material 108, is preferably provided with a layer such as nickel, gold which is well compatible with the bonding material 108.

The bonding material 108 includes brazing materials such as gold solder, silver solder or the like, and a solder material. In selecting the bonding material 108, it should take account of a material of the metallic layer 110 on the edge of the concave-shaped container 101, compatibility of the bonding material with a material of portions, through which the bonding material is joined to the sealing plate 102, and the reflow temperature. For example, in the case where the non-aqueous electrolyte cells and electric double layer capacitors according to the invention are mounted to the substrate at 240° C. by means of reflow, it is preferable to use a solder material, which melts at 300° C.

A way to seal the concave-shaped container 101 and the sealing plate 102 can make use of a technique such as thermo compression bonding, ultrasonic welding, resistance welding and so on, and is no particularly limitative. It is sufficient to select the best technique depending upon the materials of the concave-shaped container 101 and the sealing plate 102. In the case where resins are joined to each other or a resin and ceramics or metal are joined to each other, it is possible to make use of thermal melting and ultrasonic welding. In the case where ceramics are joined to each other or ceramics and metal are joined to each other, it is possible to perform thermal melting and ultrasonic welding with a resin interposed between the joining members or to make use of a bonding agent. To dip the joining members in a thermosetting resin after the sealing is effective in enhancing reliability.

In the case where the non-aqueous electrolyte cells and electric double layer capacitors according to the invention should be made small-sized, it is effective to form solder bumps on portions which make collectors serving as joining terminals. That is, it is effective to form them on the metallic layers on portions of the joining terminals A, B and the side surfaces of the container. Methods of forming solderbumps include plating, a gas phase method such as vapor deposition, a printing method, a micropressing method a ball bonding method and the like.

An insulating film having a large ion permeability and a predetermined mechanical strength is used to form the separator 105. In reflow soldering, it is possible to most stably use glass fiber and also to use a resin, such as polyphenylene sulfide, polyethylene terephthalate, polyamide, polyimide and so on, having the thermal deformation temperature of 230° C. or higher. Bore diameter and thickness of the separator are not specifically limitative, but are a matter of design determined on the basis of current value of a device, in which the non-aqueous electrolyte cells and electric double layer capacitors according to the invention a reused, and the capacitor internal resistance. Also, it is possible to use porous ceramic bodies.

The electrolyte is not specifically limitative, and is a nonaqueous solvent used for conventional electric double layer capacitors and non-aqueous secondary batteries. The above-mentioned nonaqueous solvent includes cyclic ester kinds, linear ester kinds, cyclic ether kinds, linear ether kinds, and so on.

In the case where the electric double layer capacitors according to the invention are used for reflow soldering, a nonaqueous solvent having a boiling point of 200° C. or higher under normal pressure is stable as the electrolyte. The reflow temperature is in some cases as high as around 250° C., which is believed to be due to an increase in pressure within the battery at that temperature, and rupture of the battery did not occur even in the case where γ-butyrolactone (γBL) having a boiling point of 204° C. under normal pressure was used. It was favorable. to use propylene carbonate (PC), ethylene carbonate (EC), γ-butyrolactone (γBL) separately or in composite.

As support salt, it is possible to use one or more of lithium salts such as $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PPF_6$, $(C_2H_5)_4PCF_3SO_4$, $(C_2H_5)_4NPF_4$, lithium perchlorate ($LiClO_4$), lithium phosphate hexafluoride ($LiPF_6$), lithium fluoroborate ($LiBF_4$), lithium arsenium hexafluoride ($LiAsF_6$), trifluoromethane sulfonic acid lithium ($LiCF_3SO_2$), bistrifluoromethyl sulphonyl imide lithium [$LiN(CF_3SO_2)_2$], thiocyanic salt, aluminum fluoride salt and so on.

In particular, it was effective to use polyethylene oxide derivatives or polymers containing the polyethylene oxide derivatives, polypropylene oxide derivatives or polymers containing the polypropylene oxide derivatives, phosphate ester polymers, PVDF or the like in combination with the above-mentioned nonaqueous solvent and the support salt in a gel state or solid state. While a large amount of the above-mentioned generated in some cases to interfere with sealing in the case where heat was applied in sealing the concave-shaped container 101 an the sealing plate 102 and in the case where a liquid electrolyte was used, sealing has been able to be simply carried out by the use of a gel or solid electrolyte.

Also, sealing is made further simple when an inorganic solid electrolyte of $Li_2S/SiS_2/Li_4SiO_4$ is used.

Since the use of a gel or solid electrolyte can prevent inner short-circuiting due to lithium dendrite even when a lithium metal serves as a negative electrode, a lithium metal having a large capacity can be used as the anode active-material.

Figure 2:
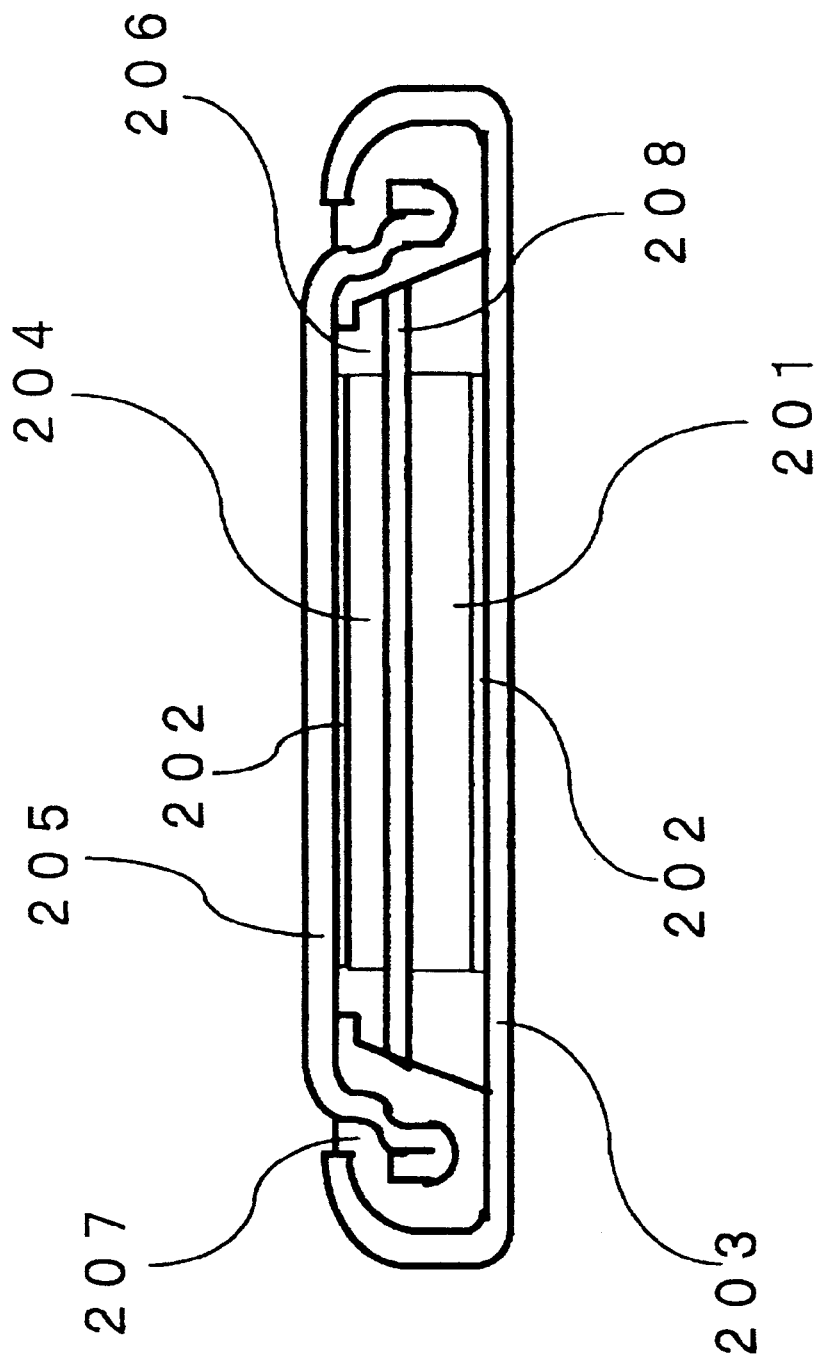
FIG. 2 is a cross sectional view showing a non-aqueous electrolyte cell and an electric double layer capacitor according to the prior art.

The non-aqueous electrolyte cells and electric double layer capacitors according to the invention are fundamentally free in configuration. A conventional electric double layer capacitor, in which sealing is achieved by caulking, as shown in FIG. 2 is limited to a substantially circular configuration. Therefore, when such conventional electric double layer capacitors are attempted to be arranged on the same substrate as that where other electronic parts, most of which are rectangular in configuration, are arranged, dead spaces are inevitably produced, resulting in spatial waste. The electric double layer capacitor according to the invention affords design in rectangular configuration, whereby it can be efficiently arranged on the substrate because of no lugs such as terminals and the like.

Embodiment 1

An electric double layer capacitor was manufactures by the use of a similar container to that shown in FIG. 1. The concave-shaped container 101 was made of alumina to have a size of 5×5×1 mm. A concave-shaped recess was 0.6 mm in depth and 5×5mm in size. Wiring such as the joining terminal A103, joining terminal B104, the metallic layer, 109, which made first collector, and the metallic layer 110 on the edge of the top surface of the concave-shaped container were provided by applying gold plating on tungsten. The concave-shaped container was prepared by using a nickel plate of 0.15 mm in thickness.

The active material was prepared by adding to 45 parts of a commercially available activated carbon (of 2260 $m^2$/g of specific surface area) 65 parts of carbon black as a conductive material, 40 parts of polyethylene oxide (PEO) as a gelling agent, 4 parts of $(CH_3)(C_2H_5)_3NBF_4$ as an electrolyte, and further 50 parts of a solution, which was obtained by dissolving 1 mol/L of $(CH_3)(C_2H_5)_3NBF_4$ into PC, and kneading them at 100° C. with a kneader (two-axle kneader). The material thus kneaded was milled with a rolling press to provide a sheet of 0.22 mm in thickness. Further, the sheet was dried at 100° C. until it was reduced by 15% in weight. The resulting sheet was cut into pieces of 3.6×3.6 mm to provide the cathode active-material 106 and the anode active-material 107.

Subsequently, 30 parts of a solution, which was obtained by dissolving 1 mol/L of $(CH_3)(C_2H_5)_3NBF_4$ into PC, was added to 10 parts of PEO to be kneaded at 100° C. with a kneader (two-axle kneader). The material thus kneaded was interposed between nonwoven PPS clothes of 30 $\mu$m in thickness and milled with a rolling press to provide a sheet of 0.2 mm in thickness. The resulting sheet was cut into pieces of 4×4 mm to provide the separator 105.

The cathode active-material 106, the separator 105 and the anode active-material 107 were inserted in this order into the concave-shaped container 101, and an Au-based solder sheet of 80 $\mu$m in thickness, 5×5 mm in size and 0.5 mm in peripheral width, having the melting point of 320° C. was placed as the bonding material 108 on the edge of the concave-shaped container 101. Further, the sealing plate 102 of nickel was placed on the resulting product and pressurized by a flat copper plate having been heated to 340° C. for sealing.

Subsequently, a creamed solder was applied to portions on the substrate where the joining terminals were actually positioned, and the electric double layer capacitor thus manufactured was subjected to reflow soldering. The reflow soldering was carried out under the condition of preheating at 180° C. during 10 minutes and heating at 240° C. during 1 minute, with the result that there was caused no rupture or the like.

Embodiment 2

A non-aqueous electrolyte cell was manufactured by using the same concave-shaped container 101 as that in the embodiment 1.

A cathode active-material was prepared by adding to 50 parts of a commercially available $MoO_3$ 35 parts of carbon black as a conductive material, 40 parts of polyethylene oxide (PEO) as a gelling agent, 4 parts of $LiBF_4$ as an electrolyte, and further 20 parts of a solution, which was obtained by dissolving 1 mol/L of $LiBF_4$ into γ-BL/EC (1:1), and kneading them at normal temperature with a kneader (two-axle kneader). The material thus kneaded was milled with a rolling press to provide a sheet of 0.21 mm in thickness. Further, the sheet was dried at 100° C. until it was reduced by 5% in weight. The resulting sheet was cut into pieces of 3.6×3.6 mm to provide the cathode active-material 106.

The anode active-material 107 was prepared by cutting a lithium sheet of 0.2 mm in thickness into pieces of 3.6×3.6 mm.

Subsequently, 30 parts of a solution, which was obtained by dissolving 1 mol/L of $LiBF_4$ into γ-BL/EC (1:1), was added to 10parts of PEO to be kneaded at normal temperature with a kneader (two-axle kneader). The material thus kneaded was interposed between nonwoven PPS clothes of 30 μm in thickness and milled with a rolling press to provide a sheet of 0.2 mm in thickness. The resulting sheet was cut into pieces of 4×4 to provide the separator 105.

The cathode active-material 106, the separator 105 and the anode active-material 107 were inserted in this order into the concave-shaped container 101, and an Au-based solder sheet of 80 μm in thickness, 5×5 mm in size and 0.5 mm in peripheral width, having the melting point of 320° C. was placed as the bonding material 108 on the edge of the concave-shaped container 101. Further, the sealing plate 102 of nickel was placed on the resulting product and pressurized by a flat copper plate having been heated to 340° C. for sealing.

Subsequently, a creamed solder was applied to portions on the substrate where the joining terminals were actually positioned, and the non-aqueous electrolyte cell thus manufactured was subjected to reflow soldering. The reflow soldering was carried out under the condition of preheating at 180° C. during 10 minutes and heating at 240° C. during 1 minute, with the result that there was caused no rupture or the like.

It has been found that the constitution according to the invention can be subjected to reflow soldering in either non-aqueous electrolyte cells or electric double layer capacitors without any problem.

Embodiment 3

A non-aqueous electrolyte cell was manufactured by using an inorganic solid electrolyte for the separator 105 with the same constitution as that in the embodiment 2.

As the inorganic solid electrolyte, a lithium-ion conductive, crystallized glass was used which contained $Li_2S/SiS_2/Li_4SiO_4$ and presented $10^{-3} Scm^{-1}$ of ion conductivity. The glass was of 4×4×0.2 mm in size.

The cathode active-material 106, the solid electrolyte and the anode active-material 107 were inserted in this order into the concave-shaped container 101, and an Au-based solder sheet of 80 μm in thickness, 5×5 mm in size and 0.5 mm in peripheral width, having the melting point of 320° C. was placed as the bonding material 108 on the edge of the concave-shaped container 101. Further, the sealing plate 102 of nickel was placed on the resulting product and pressurized by a flat copper plate having been heated to 340° C. for sealing.

A creamed solder was applied to portions on the substrate where the joining terminals were actually positioned, and the non-aqueous electrolyte cell thus manufactured was subjected to reflow soldering. The reflow soldering was carried out under the condition of preheating at 180° C. during 10 minutes and heating at 240° C. during 1 minute, with the result that there was caused no rupture or the like.

Since the use of the inorganic solid electrolyte for the separator 105 eliminates short-circuiting, in which lithium dendrite generates on the negative electrode side lithium, reliability in cyclic life is markedly improved.

Embodiment 4

A non-aqueous electrolyte cell was manufactured by using $Li_4Ti_5O_{12}$ for the cathode active-material with the same constitution as that in the embodiment 3.

A cathode active-material was prepared by adding to 50 parts of a commercially available $Li_4Ti_5O_{12}$ 35 parts of carbon black as a conductive material, 40 parts of polyethylene oxide (PEO) as a gelling agent, 4 parts of $LiBF_4$ as an-electrolyte, and further 20 parts of a solution, which was obtained by dissolving 1 mol/L of LiBF4 into γ-BL/EC (1:1), and kneading them at normal temperature with a kneader (two-axle kneader). The material thus kneaded was milled with a rolling press to provide a sheet of 0.21 mm in thickness. Further, the sheet was dried at 100° C. until it was reduced by 5% in weight. The resulting sheet was cut into pieces of 3.6*33* 3.6 mm to provide the cathode active-material 106.

The cathode active-material 106, the solid electrolyte and the anode active-material 107 were inserted in this order into the concave-shaped container 101, and an Au-based solder sheet of 80 μn thickness, 5×5 mm in size and 0.5 mm in peripheral width, having the melting point of 320° C. was placed on the edge of the concave-shaped container 101. Further, the sealing plate 102 of nickel was placed on the resulting product and pressurized by a flat copper plate having been heated to 340° C. for sealing.

The non-aqueous electrolyte cells thus manufactured involved no problem in reflow soldering. Since $Li_4Ti_5O_{12}$ was used as the cathode active-material 106, a cell resistant to overdischarge could be manufactured.

In the non-aqueous electrolyte cells and electric double layer capacitors according to the invention, reduction in a substrate-shaped space can be achieved since the joining terminals are made integral with the storage container and disposed in the lower portion of the container. Also, the non-aqueous electrolyte cells and electric double layer capacitors are made up of heat-resistant members to thereby afford reflow soldering.

What is claimed is:

1. A power source element comprising: a container made of an insulation material and having a base portion and a plurality of side portions extending from the base portion to define an interior space and an open end of the container; an anode active material disposed in the interior space of the container; a cathode active material disposed in the interior space of the container; a separator disposed between the anode active material and the cathode active material; an electrolyte saturating the anode active material, the cathode active material and the separator; a first current collector connected to an inner surface of the base portion of the container; a first connecting terminal disposed on an outer surface of the base portion of the container and electrically connected to the first current collector; a second current collector connected to the side portions of the container; and a second connecting terminal disposed on the outer surface of the base portion of the container and electrically connected to the second current collector.

2. A power source element according to claim 1; wherein the second current collector comprises a sealing member disposed over the open end of the container for sealing the interior space of the container.

3. A power source element according to claim 2; further comprising a bonding material for bonding the sealing member to the side portions of the container.

4. A power source element according to claim 1; wherein each of the connecting terminals has a given length and is disposed generally parallel to the outer surface of the base portion of the container along its length.

5. A power source element according to claim 1; wherein the power source element comprises a non-aqueous electrolyte cell.

6. A power source element according to claim 1; wherein the power source element comprises an electric double layer capacitor.

7. A power source element according to claim 1; wherein the second current collector comprises a metallic layer disposed on the side portions of the container.

8. A power source element according to claim 7; further comprising a sealing member disposed over the open end of the container for sealing the interior space of the container.

9. A power source element according to claim 8; further comprising a bonding material for bonding the sealing member to the side portions of the container.

10. A power source element according to claim 9; wherein the bonding material is disposed between the sealing member and the metallic layer.

11. A power source element according to claim 8; wherein the sealing member is made of an insulation material.

12. A power source element according to claim 7; wherein the metallic layer is comprised of a material having as a main component a metal selected from the group consisting of tungsten, nickel, silver, platinum and gold.

13. A power source element according to claim 1; wherein the insulation material of the container is selected from the group consisting of heat resisting resins, glass, ceramics and ceramic glass.

14. A power source element according to claim 1; wherein the first current collector and the first and second connecting terminals are comprised of a material having as a main component a metal selected from the group consisting of tungsten, nickel, silver, platinum and gold.

15. A power source element according to claim 1; wherein the second current collector comprises a sealing member disposed over the open end of the container for sealing the interior space of the container; and further comprising one of a brazing material and a solder material for connecting the sealing member to the container.

16. A power source element according to claim 1; further comprising a sealing member disposed over the open end of the container for sealing the interior space of the container; and further comprising one of a brazing material and a solder material for connecting the sealing member to the container.

17. A power source element according to claim 1; wherein the electrolyte comprises one of a solid electrolyte substance or a gel electrolyte substance.

18. A power source element comprising: a container made of an insulation material and having an interior space containing an anode active material, a cathode active material spaced apart from the anode active material, and an electrolyte material; a first current collector disposed on an inner base surface of the container; a first connecting terminal disposed on an outer base surface of the container and electrically connected to the first current collector; a second current collector connected to the container; and a second connecting terminal disposed on the outer base surface of the container and electrically connected to the second current collector.

19. A power source element according to claim 18; wherein the second current collector comprises a sealing member for sealing the interior space of the container.

20. A power source element according to claim 19; further comprising a metallic layer disposed on the container for connecting the sealing member to the second connecting terminal.

21. A power source element according to claim 20; wherein the insulation material of the container is selected from the group consisting of heat resisting resins, glass, ceramics and ceramic glass.

22. A power source element according to claim 21; wherein the sealing member, the metallic layer and the first and second connecting terminals are comprised of a material having as a main component a metal selected from the group consisting of tungsten, nickel, silver, platinum and gold.

23. A power source element according to claim 22; wherein the power source element comprises a non-aqueous electrolyte cell.

24. A power source element according to claim 22; wherein the power source element comprises an electric double layer capacitor.

25. A power source element according to claim 18; wherein the sealing member, the metallic layer and the first and second connecting terminals are comprised of a material having as a main component a metal selected from the group consisting of tungsten, nickel, silver, platinum and gold.

26. A power source element according to claim 25; wherein the power source element comprises a non-aqueous electrolyte cell.

27. A power source element according to claim 25; wherein the power source element comprises an electric double layer capacitor.

28. A power source element according to claim 18; further comprising a sealing member for sealing the interior space of the container and connected to the container by one of a brazing material and a solder material.

29. A power source element according to claim 28; wherein the power source element comprises a non-aqueous electrolyte cell.

30. A power source element according to claim 28; wherein the power source element comprises an electric double layer capacitor.

* * * * *